May 27, 1969 H. Z. BOGERT ET AL 3,447,136
APERIODIC ARITHMETIC CALCULATOR
Filed Oct. 18, 1966 Sheet 1 of 2
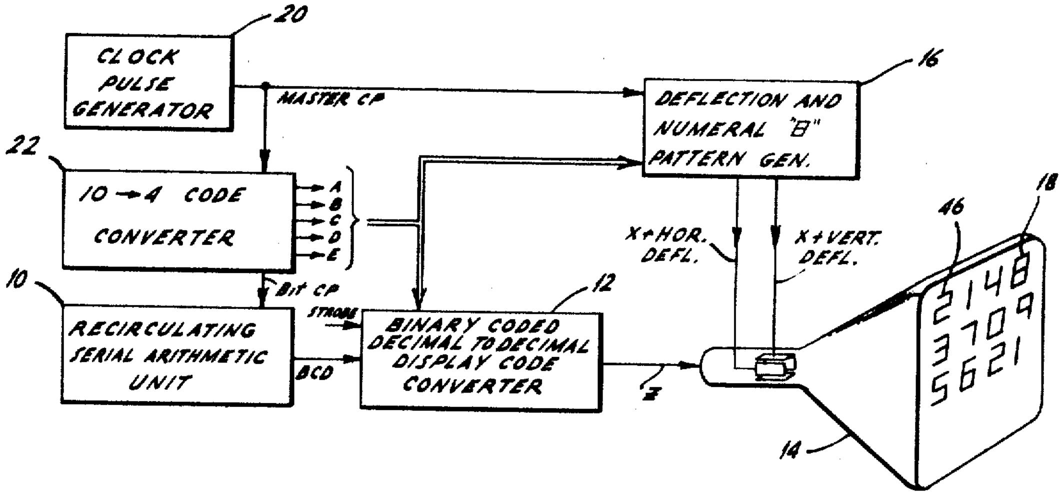
FIG. 1. - ARITHMETIC CALCULATOR
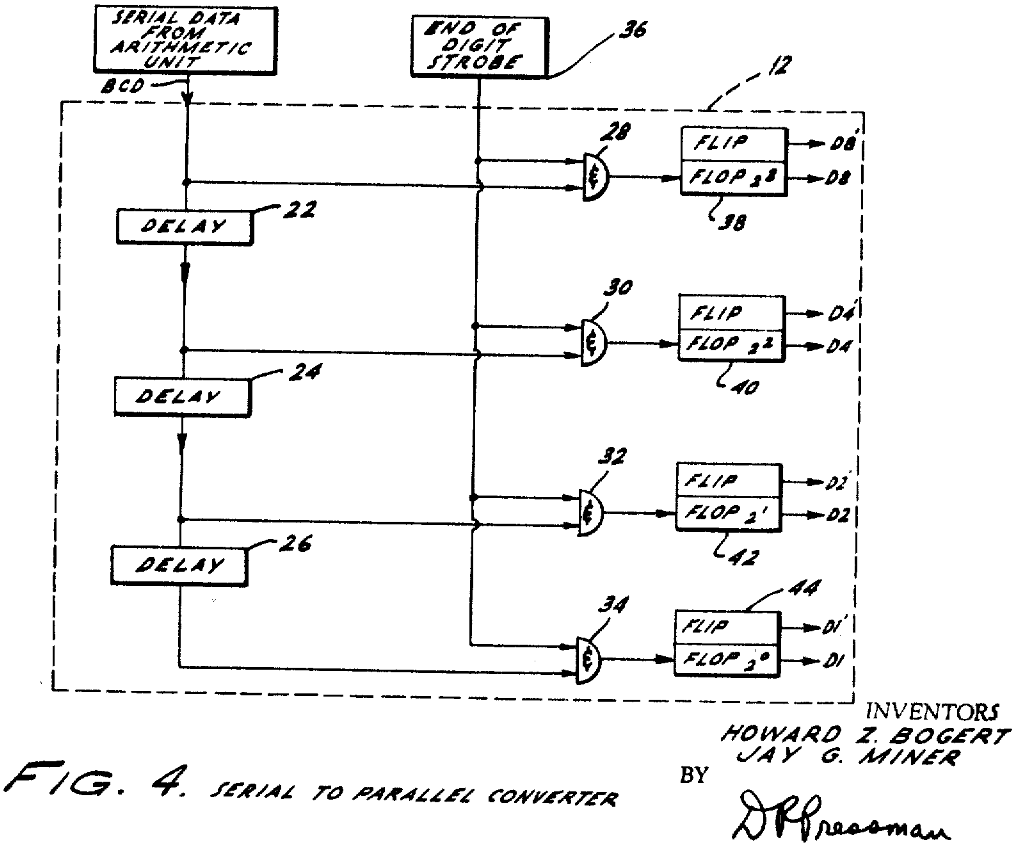
FIG. 4. SERIAL TO PARALLEL CONVERTER
INVENTORS
HOWARD Z. BOGERT
JAY G. MINER
BY
D R Freedman
ATTORNEY

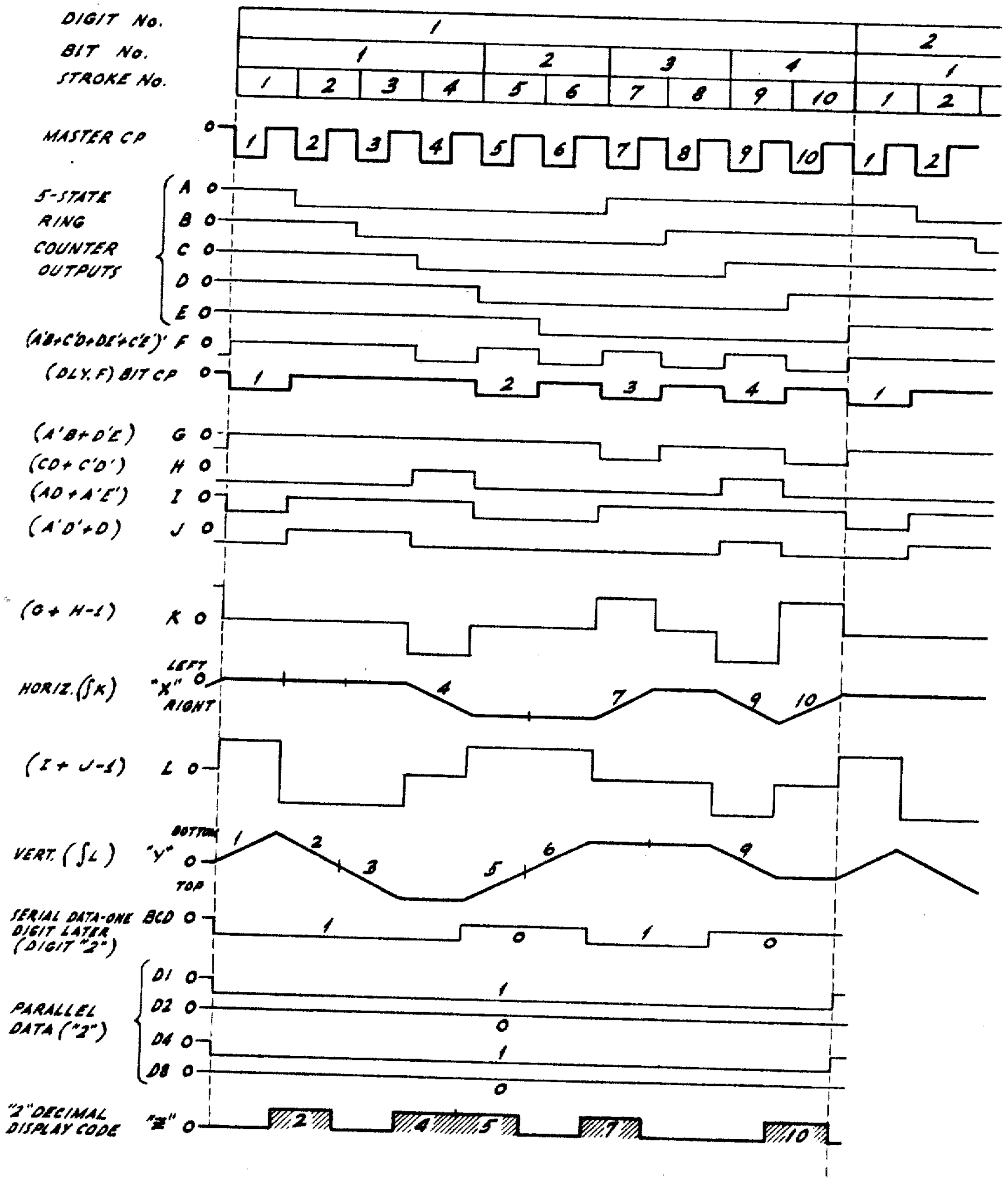
FIG. 2. CALCULATOR WAVEFORMS
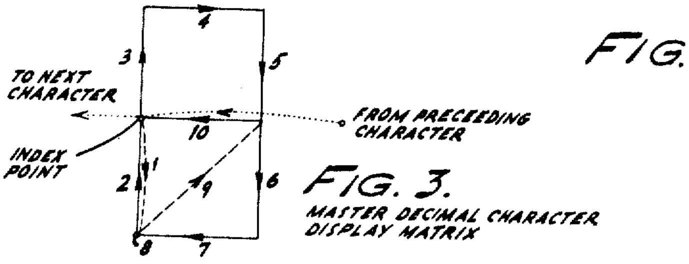
FIG. 3. MASTER DECIMAL CHARACTER DISPLAY MATRIX
INVENTORS
HOWARD Z. BOGERT
JAY G. MINER
BY D R Bressman
ATTORNEY United States Patent Office 3,447,136

Patented May 27, 1969

3,447,136

APERIODIC ARITHMETIC CALCULATOR

Howard Z. Bogert, Cupertino, and Jay G. Miner, Sunnyvale, Calif., assignors to Philco-Ford Corporation, Philadelphia, Pa., a corporation of Delaware Filed Oct. 18, 1966, Ser. No. 587,462
Int. Cl. G11b 13/00
U.S. Cl. 340—172.5 10 Claims

ABSTRACT OF THE DISCLOSURE

Calculator in which arithmetic and display units operate with information-representative pulses of respectively different widths and respectively different code radices, the smaller of which is not evenly divisible into the larger. Calculator is clocked aperiodically in a manner such that (1) the arithmetic unit produces pulses of each radix group which have nonuniform widths, and (2) a whole number of pulses in the display unit (which employs the larger code radix) occurs during each arithmetic unit pulse.

This invention relates to arithmetic calculators and particularly to a novel method of clocking a serial arithmetic calculator of the type which includes separate circuits for handling binary and decimal numbers.

In a serial arithmetic calculator, certain components, such as the arithmetic unit, operate with binary numbers (ONES and ZEROES), while other components, such as the cathode ray tube dynamic display device, operate with decimal numbers (0 to 9). Since both the binary and decimal components of a calculator must operate in synchronism, a master clock pulse generator must be provided for driving both types of components. The master clock pulses cannot, however, be used to drive both the decimal and binary components directly since, although each of the binary and decimal numbers is processed in the same time interval, a different number of clock pulses are required to generate a decimal number than are required to process a binary number. That is, if N clock pulses are required to generate a display of a decimal number, and if M binary numbers (bits) are required to represent a decimal number, then the binary components must be clocked with M pulses for every N pulses supplied to the decimal components. Since most calculators require more clock pulses to generate a display of a decimal number than the resceptive binary counterparts thereof ($M<N$), the decimal components are usually clocked directly by the master (highest frequency) clock pulses, while the binary components are clocked at a submultiple of the master clock pulse rate by a train of bit clock pulses which are derived from the master clock pulses in order to maintain synchronism.

Heretofore, in a calculator of the type aforedescribed, adjacent pulses in the bit clock pulse train had equally spaced leading edges; thus the binary components were clocked periodically. Several disadvantages from this method of clocking a binary component such as an arithmetic unit.

When an arithmetic unit is clocked periodically, the binary bits circulating therein will also occur periodically so that there wll be no way to tell, from the circulating serial binary data, where each binary number begins and ends. Thus some sort of bit counter must be utilized in the calculator, or a marking pulse must be inserted in the binary data after every N bits, in order to be able to recognize the beginning and end of each binary word. Accordingly it is one object of the present invention to provide an arithmetic calculator in which the circulating binary data includes an inherent marker and hence does not require a separate bit counter or special marker pulses to separate adjacent binary words.

Another disadvantage of periodic clocking stems from the fact that in arithmetic calculators it is usually found that more logical operations will take place during one or more given bit intervals of each binary word than in the remaining bit intervals thereof. Since more logical operations take additional time, it is necessary, in a periodically-clocked calculator, to slow the clock pulse rate so that the period thereof is at least as great as the time required to perform the longest group of logical operations which occur during any bit interval. This practice of course is wasteful of calculating time since the calculator will be clocked slower than its allowable operating rate for the remaining bit intervals of each binary word in which fewer logic operations occur. Accordingly it is another object of the present invention to provide an arithmetic calculator in which this wastage of calculating time is reduced.

If the calculator is of the type in which the number (N) of master clock pulses required to generate each decimal digit is not evenly divisible by the number (M) of digits per binary word, it will be apparent that a nonintegral number of master clock pulses per bit pulse will be generated. For example if ten clock pulses are required to generate a decimal digit and there are four bits per binary word, $N/M=10/4=2.5$, so that 2.5 master clock pulses will be generated for each bit clock pulse. This mode of operation is undesirable since it requires that the leading edge of some of the bit clock pulses be phased between leading edges of the master clock pulses. This requires a finer timing tolerance in the calculator than the period of the master clock pulses. Also it causes many arithmetic and logical decisions to occur out of phase with the master or decimal clock pulses. As will be apparent to those skilled in the art, this greatly increases the difficulty of synchronizing the calculator and making binary to decimal conversions. In addition, calculator reliability is adversely affected. Accordingly it is a further object of the present invention to simplify and improve the operation of arithmetic calculators of the type in which the number of bits in each binary word is not evenly divisible into the number of clock pulses required to generate a decimal number.

Further objects and advantages of the present invention will become apparent from a consideration of the ensuing description thereof.

*Summary*

According to one aspect of the present invention a serial arithmetic recirculating calculator is provided in which the binary components are clocked aperiodically such that in every group of M clock pulses, where M represents the number of binary bits per word, certain clock pulses have a leading edge to leading edge spacing greater than that of the other clock pulses in said group.

*Drawings*

FIG. 1 of the drawing shows an arithmetic calculator cording to the invention.

FIG. 2 shows certain waveforms present in said calculator.

FIG. 3 shows a master decimal character display ma-.x which may be used in said calculator.

FIG. 4 shows a serial to parallel converter utilized in ıde converter of the calculator of FIG. 1.

*FIG. 1—Arithmetic calculator*

FIG. 1 shows a calculator in block diagram and picrial form.

The calculator comprises a recirculating serial arithetic unit 10 which is arranged to receive digital data om an input unit (not shown) and perform a desired ithmetic operation or operations on said data. The arithetic unit includes one or more shift registers through hich binary-encoded serial data circulates in order to ·ovide temporary storage thereof during arithmetic op-ations and in order to provide a recurrent drive for a ʼnamic display unit during a display mode which ocırs after the arithmetic operations are completed.

When the calculator completes its assigned arithmetic ›erations it supplies data for display purposes in binary ›ded decimal (BCD) form to a BCD-to-decimal display ›de converter 12 which is arranged to convert the BCD ıta to a suitable decimal unblanking code for driving .e Z-axis input of a dynamic display unit comprising a ıthode ray tube 14. The X and Y axes of CRT 14 are :iven by a deflection and numeral 8 pattern generator 6 which is arranged to cause an electron beam originat-ıg at the cathode of CRT 14 to trace out a series of ›ws of master decimal matrix symbols comprising nuıeral 8's such as shown at 18 on the faceplate of CRT 4. Converter 12 supplies an input to the Z-axis of CRT 4 in order to turn on the electron beam at the proper mes so as to change the master decimal matrix into articular decimal digits represented by the BCD input › converter 12.

All of the components of the calculator are driven in ʼnchronism by a master clock pulse generator 20 which ıpplies periodic clock pulses to generator 16 and to a :n-to-four code converter 22. The master clock pulses ıpplied to generator 16 are used to generate horizontal nd vertical staircase deflection waveforms in a manner ʼell-known to those skilled in the art. In code converter 2 the master clock pulses are converted into five sigals, A to E, which are also supplied to generator 16 and › converters 12 and 22. In generator 16 the signals A › E are utilized to generate the X and Y waveforms ʼhich cause an electron beam originating at the cathode f CRT 14 to trace out each master decimal matrix 8 uring each quiescent interval of the horizontal staircase ʼaveform. The A to E signals supplied to converter 12 re combined with the BCD input to converter 12 in rder to convert the BCD input to a suitable unblanking ıput for CRT 14. In converter 22, the A to E signals re also used to generate an aperiodic train of bit clock ulses which are used to drive arithmetic unit 10 and ʼhich provide the advantages of the invention aforedisussed.

*FIG. 2—Calculator waveforms*

FIG. 2 shows time v. voltage amplitude plots of various ignal waveforms in the calculator of FIG. 1. At the top f FIG. 2 are three sets of reference blocks which show ıccessively from top to bottom a digit interval, the cor-esponding bit intervals which occur during the digit in-:rval, and the corresponding stroke or master pulse in-:rvals which also occur during the digit interval.

Each digit interval represents the time required for a ıaster decimal character matrix to be generated on the aceplate of CRT 14 or the time required for a binary-ncoded number to circulate past any point in or to be processed by the calculator. A bit interval represents the time required for one bit of the binary-encoded number to circulate past a given point or the interval between the leading edges of successive pulses in the bit clock pulse waveform. According to the invention, the size of the bit intervals are not uniform, as will be explained. Since the binary code used in the calculator requires four bits to represent a number, there are four bit intervals per digit interval. A stroke interval represents the time required to generate one of the ten strokes required to generate the master decimal character matrix 8 of the display.

The master clock pulse train, which is supplied by generator 20 and is shown just below the reference blocks, comprises a series of negative pulses in which the leading edges of adjacent pulses are equally spaced. Ten pulses of the master clock pulse train define a digit interval. In one embodiment of the invention the master clock pulses had a repetition rate of 330 kHz. As discussed in the copending application of the present inventors, Ser. No. 587,448, filed Oct. 18, 1966, the master clock pulses may occur at different frequencies during the calculating and display modes of operation, respectively, in order to save power and increase calculating speed.

In the ten-to-four code converter 22, the master clock pulses are supplied to a five state ring counter (not shown) which supplies the five signals A to E aforementioned. As shown in FIG. 2 just below the master clock pulse waveform, signals A to E are each one-tenth the frequency of the master clock pulses, have a duty cycle of 50%, and are phased so that each of the four signals B to E occurs one stroke interval later than the succeeding signal, while signal A occurs six stroke intervals after signal E.

Signals A to E are combined logically in converter 22 using inverters, AND gates, and a NOR gate (not shown) according to the Boolean formula $$(A'B+C'D+DE'+C'E')'$$

to yield an aperiodic signal F. Signal F is delayed by one stroke interval (e.g., by having the trailing edge of each pulse thereof trigger a monostable multivibrator) to generate the aperiodic bit clock pulse train shown just below waveform F.

According to the invention the leading edge to leading edge spacing between every $M^{th}$ pulse (where M is the number of bits per binary word) in the bit clock pulse train and the next sequential pulse is longer than that between at least two adjacent pulses in the next M pulses following each such $M^{th}$ pulse. Since four bits per word are utilized in arithmetic unit 10 ($M=4$), the bit clock pulse train comprises a repeating group of four pulses wherein the space between two of the pulses (in the example shown, the first and second pulses) is greater than that between at least two of the next four pulses. In the example shown the spacing between adjacent pulses in the next four pulses is identical and twice the period of the master clock pulses and half the space between leading edges of the first and second bit clock pulses. The leading edge of each of the bit clock pulses occurs in synchronism with the leading edge of each of the bit clock pulses occurs in synchronism with the leading edge of one of the master clock pulses. This format can be modified within the scope of the invention, as will be discussed later.

In the deflection and numeral 8 pattern generator 16, the master clock pulses generate horizontal and vertical staircase deflection signals (not shown) while the ring counter outputs A to E generate the X and Y signals which cause the electron beam to generate the master decimal character matrix. The X and horizontal staircase deflection signals are supplied to the horizontal deflection plates (or yoke) of CRT 14 while the Y and vertical staircase deflection signals are supplied to the vertical plates (or yoke) thereof.

The X and Y signals are generated from the A to E signals in generator 16 as follows. The A to E signals are first combined logically according to the four formulas given in the left hand side of FIG. 2 opposite waveforms G to J to generate four synthesizing signals G to J. Signals G and H are added algebraically and the sum is given a negative level shift to produce signal K, while signals I and J are also added algebraically and given a negative level shift to prodce waveform L. Signals K and L are each integrated to yield the X and Y signals shown.

*FIG. 3—Display matrix*

The master decimal character matrix of FIG. 3 is generated by the X and Y signals as follows. Initially the electron beam travels from an index point on the preceding character to the index point of the present character in a rapid manner under control of the horizontal deflection staircase waveform. This path is indicated by the dotted line which is drawn curved in order to separate it from the actual lines of the matrix; in reality the path of the beam is straight between index points and of courses is always blanked.

When the beam reaches the index point of the present character the horizontal staircase deflection signal rests for one digit interval and the X and Y signals take over. The X signal remains at zero for the first three strokes but the Y signal rises during the first stroke, causing the electron beam to go to the bottom left corner of the character as indicated by the dashed line which is curved and drawn separately from the second stroke in order to show the same clearly. This first stroke is always blanked. During the second and third strokes the Y signal proceeds from its positive value to its most negative value causing the beam to travel from the lower left corner to the upper left corner of the character. The Y signal remains unchanged during the fourth stroke while the X signal proceeds to a negative value, causing the beam to go to the upper right corner of the character. During the fifth and sixth strokes the X signal remains unchanged, but the Y signal goes from its most negative to its most positive value, causing the beam to travel from the upper right corner to the lower right corner of the character. During the seventh stroke of the Y signal is unchanged but the X signal goes from its negative value to zero, causing the beam to move from the lower right corner to the lower left corner of the character. During the eighth stroke of the X and Y signals are both unchanged, allowing the beam to dwell at the lower left hand corner of the character for one full stroke. If a decimal point is to be generated to the left of the character a positive pulse having an amplitude approximately equal to one half the amplitude of a step in the horizontal sawtooth deflection waveform is applied to the horizontal deflection plates during this interval, causing the electron beam dwell during the eighth stroke to occur to the left of the character so as to generate a decimal point. During the ninth stroke the beam is blanked but the X and Y signals both go in the negative direction, causing the beam to trace a diagonal path to the center of the right hand side of the character. During the tenth stroke the Y signal is unchanged while the X signal goes to zero, causing the beam to generate a horizontal stroke which returns the beam to the original index point at the center of the left hand side. Thereafter the horizontal deflection staircase signal will cause the beam rapidly to travel to the index point on the next character where the foregoing ten strokes will be repeated in identical manner in the next digit interval.

*BCD to decimal display code converter*

The code converter 12 of FIG. 1 combines the BCD signal from arithmetic unit 10 with the A to E waveforms in order to generate suitable unblanking codes for application to the Z-axis input of CRT 14 as follows. For exemplary purposes it will be assumed that the BCD signal during the digit interval preceding the first digit interval shown in FIG. 2 represents the decimal number 2 in the "excess three" binary code. In the excess three code the bits of the binary word represent factors of successive powers of two in a series whose sum is greater by three than the encoded decimal number. Thus when the BCD signal represents the decimal 2, the binary number 1010 will be supplied, since $1\times2^0+0\times2^1+1\times2^2+0\times2^3=5$ and $5-3=2$. This signal is shown in FIG. 2 adjacent the legend "Serial Data."

In converter 12 the BCD signal is supplied to a serial to parallel converter which is shown in FIG. 4. The FIG. 4 circuit comprises a series of delay lines 22, 24, and 26, whose delays are adjusted so that when the fourth bit of each binary word is supplied to the input of delay 22, the first bit will appear at the output of delay 26, the second bit will appear at the output of delay 24, and the third bit will appear at the output of delay 22. The inputs of delays 22, 24, and 26 and the output of delay 26 are connected to the bottom inputs of AND gates 28, 30, 32, and 34, respectively. The other inputs of each of these AND gates are connected to an end-of-digit strobe source 36 which is arranged to strobe the four AND gates at the end of each digit. A suitable strobe pulse may be generated for example from the C and E signals according to the logic C'E. Thus the outputs of AND gates 28, 30, 32, and 34 at the end of each digit will be four simultaneous pulses corresponding to the four serial bits in the BCD signal. The outputs of the AND gates are connected to the inputs of the four respective flip-flops, 38, 40, 42, and 44, which are set in states corresponding to the outputs of the AND gates at the beginning of each digit interval. Thus the noncomplement outputs of the flip-flops (D1, D2, D4, and D8) will indicate for the duration of each digit interval the factors of the various powers of two in the decimal number to be represented. In the exemplary case under consideration in which a binary-encoded 2 (1010) is supplied to converter 12 from the arithmetic unit 10, the outputs D1, D2, D4, and D8 of the flip-flops will indicate the binary numbers 1, 0, 1, and 0, respectively, during the next digit interval. These outputs are shown in FIG. 2 as waveforms D1, D2, D4, and D8, respectively. The flip-flops also supply complement outputs D1', D2', D4', and D8' (not shown).

The outputs of the flip-flops are then coqmbined in converter 12 with the A to E signals in logic circuitry comprising inverters, AND gates, and NOR gates (not shown) to provide, selectively, a corresponding one of ten decimal complement unblanking signals 0' to 9' in accordance with the following Boolean equations:

$$0'=(A+B+D1'+D2'+D4+D8)'$$
$$1'=(AD+D1+D2+D4'+D8)'$$
$$2'=(AB'+CE'+A'B+D'E+D1'+D2+D4')'$$
$$3'=(BC+D'E+D1+D2'+D4')'$$
$$4'=(BC'+AD+D'E+D1'+D2'+D4')'$$
$$5'=(BD'+BE+D'E+D1+D2+D4+D8')'$$
$$6'=(AD'+BE+D'E+D1'+D2+D8')'$$
$$7'=(AC+D1+D2'+D8')'$$
$$8'=(A+B+D'E+D1'+D2'+D8')'$$
$$9'=(B+D'E+D4'+D8')'$$

It can be shown that each of the above decimal complement signals will be the complement of the correct signal required to generate the corresponding decimal number in CRT 14 by unblanking selected strokes of the master decimal matrix of FIG. 3. Thus when the BCD input to converter 12 in the preceding digit interval is the decimal 2, the complement decimal signal for correct unblanking of the Z axis of CRT 14 will be generated on the 2' lead in inverter 12 while all of the other similar leads 0', 1', and 3' to 9' will be energized with a negative voltage during the entire digit interval. The decimal complement signals 0' to 9' are then combined in a NOR te to provide an inverted polarity unblanking signal Z* accordance with the following relation:

$$Z^*=(0'+ \ldots +9')'$$

r inverting the polarity of the Z* signal, the correct unanking signal Z will be supplied the Z-axis input of ₹T 14. ($Z=Z^*$ with polarity inverted). The Z signal shown as the bottom waveform in FIG. 2. It will be ›ted that the Z signal is positive during the second, urth, fifth, seventh, and tenth stroke intervals. Thus ıring the digit interval the electron beam will be turned ı during these stroke intervals so that the corresponding strokes of the master decimal character display matrix ill be illuminated to display a 2 such as indicated at ; on the faceplate of CRT 14.

Since the arithmetic unit 10 is clocked by a periodic ock pulse train, the serial flow of binary information said arithmetic unit will be a periodic, thereby enabling parate binary words to be readily distinguished in any ne-amplitude display of the binary data in arithmetic ıit 10. As will be evident from an inspection of the CD signal in FIG. 2, the binary signal includes an in-:rent marker, thereby avoiding the use of separate bit ›unting units or a special marker pulse generator in .e arithmetic unit 10 to separate adjacent binary words. ven though the number of bits used in the binary code . the arithmetic unit (4) is not evenly divisible into the ımber of strokes required to display a digit (10), each .nary bit occurs in phase with one of the master clock ılses or strokes so that all logical decisions will occur ı phase with one of the master clock pulses, thereby ıcilitating conversion from the binary code to the deciıal unblanking code, enhancing reliability, eliminating łverse noise problems, etc. In addition no critical timing ıterval equal to half the period of the master clock ulses will be required, as would be the case if the bit lock pulse train were periodic. Also the position of the ›nger bit or bits in the bit clock pulse waveform can be djusted to the position in which most logical operations ccur in the arithmetic unit. This will effectively enable ıe calculator speed to be maximized, as aforediscussed.

It will be appreciated by those skilled in the art that, in ddition to changing the position of the wider bit, other ›rmats of the aperiodic clock pulse waveform can be sed. For example, two bit intervals could each be equal › three master clock pulse intervals with the remaining ‹vo bit intervals again each being equal to two master lock pulse intervals. In addition, when binary code raices other than four are utilized various other aperiodic rrangements may be used.

While there has been described what is at present conidered to be the preferred embodiment of the invention : will be apparent that various modifications and other mbodiments thereof will occur to those skilled in the art ‹ithin the scope of the invention. Accordingly, it is deired that the scope of the invention be limited by the .ppended claims only.

We claim:

1. An arithmetic calculator, comprising:
(a) a recirculating serial calculating unit for performing arithmetic operations on decimal digits encoded in a serial M-bit per digit binary form,
(b) means for clocking said calculating unit with a clocking train of pulses, the leading edge to leading edge spacing between every $M^{th}$ pulse in said train and the next sequential pulse being longer than the leading edge to leading edge spacing between two adjacent pulses of the next M pulses following each such $M^{th}$ pulse, M being an integer, whereby each binary-encoded digit will be identifiable in a time-amplitude display of data circulating in said calculating unit, and
(c) display means for converting said binary-encoded data circulating in said calculating unit to a visual decimal display.

2. The calculator of claim 1 further including a master clock pulse source arranged to supply a master train of uniformly-spaced pulses, and wherein said (b) means is arranged to produce a group of M pulses of said clocking pulse train in response to each N pulses of said master pulse train, where N is an integer and the quotient $N/M$ is an integer plus a fraction of an integer, the leading edge of each pulse in said clocking pulse train coinciding with a leading edge of a pulse in said master pulse train, and wherein said (c) means is arranged to generate a master decimal character display matrix in response to each N pulses from said master clock pulse source and convert each group of M bits of said circulating binary-encoded data to a display signal which, in combination with said matrix, produces a visual decimal display character.

3. The calculator of claim 2 where N is ten and M is four.

4. The calculator of claim 3 wherein, in said clocking pulse train, said spacings between pairs of adjacent pulses of said next M pulses following said $M^{th}$ pulse are identical and equal to half the spacing between said $M^{th}$ pulse and the next sequential pulse.

5. The calculator of claim 2 wherein said display means comprises a cathode ray tube and first means, responsive to each N pulses of said master pulse source, for supplying a master character matrix input to the X and Y deflection inputs of said tube, and second means, responsive to each group of M bits of said circulating binary-encoded data, for supplying a display signal to the Z axis input of said tube, said display signal being arranged to change said master character matrix to a display of the decimal digit represented by said group of M bits.

6. An arithmetic calculator, comprising:
(a) means for generating a first train of equally spaced pulses,
(b) means for generating, in response to said first pulse train, a second pulse train comprising a recurrent group of M pulses, each group being generated in response to each N pulses of said first pulse train, where N is an integer greater than three, M is an integer smaller than N, and the quotient $N/M$ is an integer plus a fraction of an integer, the leading edge of each pulse in said second train being coincident with a leading edge of a pulse in said first train,
(c) a recirculating serial calculating unit which is clocked by said second pulse train and which is arranged to perform arithmetic operations on decimal data, each digit of said data being represented by an M-bit binary code, said unit having an output terminal at which data to be displayed is supplied repetitively in said M-bit binary code form,
(d) display means including a digital displayer and (1) means for supplying a master decimal matrix input to said digital displayer in response to each N pulses of said first pulse train, and (2) means for converting said binary-encoded data at said output terminal to a display signal and supplying said display signal to said digital displayer such that each digit of said data will be displayed in viewable decimal form by said displayer.

7. The calculator of claim 6 wherein N is ten and M is four.

8. The calculator of claim 7 wherein, in any five sequential pulses of said second pulse train, the leading edge to leading edge spacings between three of said pulses and three respective succeeding pulses are equal and equal to half the spacing between a fourth of said pulses and its succeeding pulse.

9. The calculator of claim 6 wherein said displayer is a cathode ray tube and said master decimal matrix input is supplied to the X and Y axis inputs of said tube, and wherein said display signal is supplied to the Z axis input of said tube.

10. The calculator of claim 9 wherein said master matrix character comprises a figure 8 which is generated in a series of straight strokes in response to each ten pulses in said first pulse train and wherein said binary-encoded data at said output terminal comprises a four-bit binary coded decimal signal.

References Cited

UNITED STATES PATENTS

| | | | |
|---|---|---|---|
| 3,296,609 | 1/1967 | Wilhelmsen | 340—324 |
| 3,305,843 | 2/1967 | Scuitto | 340—172.5 |
| 3,307,156 | 2/1967 | Durr | 340—172.5 |
| 3,351,929 | 11/1967 | Wagner | 340—324 |

ROBERT C. BAILEY, *Primary Examiner.*

RAULFE B. ZACHE, *Assistant Examiner.*

U.S. Cl. X.R.

340—324